United States Patent [19]

Klepa

[11] 4,414,996
[45] Nov. 15, 1983

[54] SYSTEM FOR AUTOMATICALLY DISPENSING LIQUID CHEMICALS INTO AN INTERMITTENTLY FLOWING LIQUID STREAM

[75] Inventor: Peter P. Klepa, Los Angeles, Calif.
[73] Assignee: UOP Inc., Des Plaines, Ill.
[21] Appl. No.: 310,018
[22] Filed: Oct. 13, 1981
[51] Int. Cl.³ .......................................... G05D 11/02
[52] U.S. Cl. ............................. 137/101.27; 137/132; 222/56; 222/464
[58] Field of Search ............... 137/124, 131, 132, 135, 137/101.27, 101.31; 222/56, 67, 416, 464

[56] References Cited

U.S. PATENT DOCUMENTS

| | | | |
|---|---|---|---|
| 3,094,134 | 6/1963 | Currie | 137/132 |
| 3,229,854 | 1/1966 | Turnquist | 222/67 |
| 3,326,417 | 6/1967 | Tinsley | 222/56 |
| 3,368,472 | 2/1968 | Van Bouwel et al. | 137/132 |
| 3,385,483 | 5/1968 | Gilwood | 222/416 |
| 3,430,823 | 3/1969 | Hunsaker | 222/416 |
| 3,784,058 | 1/1974 | Buchtel | 222/464 |

Primary Examiner—Martin P. Schwadron
Assistant Examiner—James R. Shay
Attorney, Agent, or Firm—James R. Hoatson, Jr.; Barry L. Clark; William H. Page, II

[57] ABSTRACT

System for automatically dispensing a liquid treatment chemical from a replaceable supply bottle into an intermittently flowing liquid stream such as a recirculating water supply for a refrigeration system. The system has a feeder chamber into which the liquid stream flows which is periodically emptied by a siphon tube when the liquid reaches a level sufficient to establish a siphon effect in the siphon tube. The rising level of liquid in the chamber also actuates, by means of a float member, the valve portion of a closure assembly on the inverted top of the supply bottle. The valve portion is fed by a capillary tube and dispenses a predetermined, very small quantity of chemical each time it is actuated. The valve portion is prevented from becoming clogged by chemical crystals during inactive periods by being mounted so that its surface will be flushed each cycle by the water which rises in the feeder chamber.

7 Claims, 6 Drawing Figures

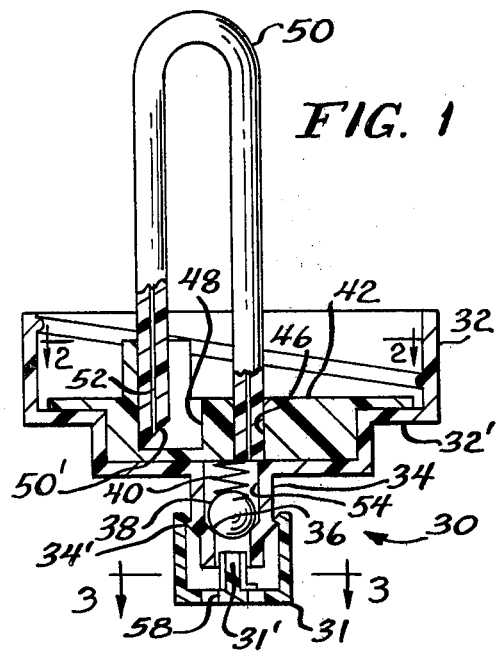
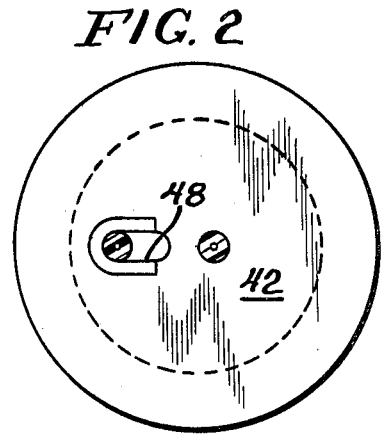
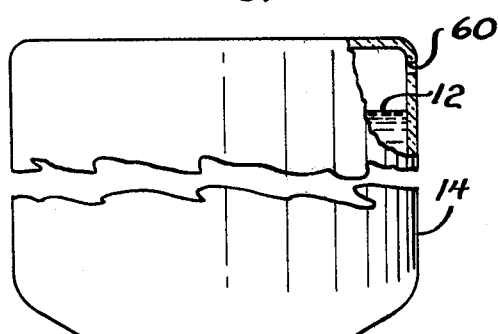
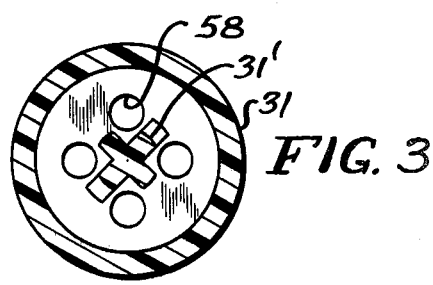
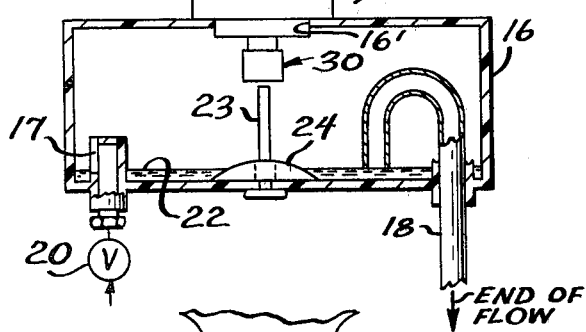
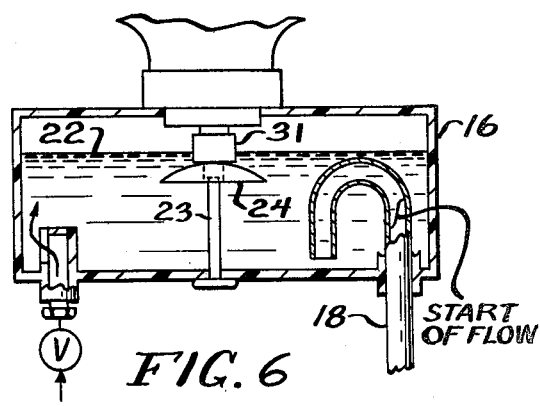

SYSTEM FOR AUTOMATICALLY DISPENSING LIQUID CHEMICALS INTO AN INTERMITTENTLY FLOWING LIQUID STREAM

BACKGROUND OF THE INVENTION

The invention relates to dispensing systems for providing an automatic discharge of a chemical to a liquid stream. For example, it is often desirable to be able to treat water streams associated with cooling towers, heat exchangers, evaporative condensers, etc. to control various problems such as microbiological fouling, corrosion and scale. Although very large installations often have very sophisticated treatment systems and regularly scheduled maintenance, there are many somewhat smaller systems which could operate without maintenance for a few weeks to a few months if a relatively small quantity of treatment chemical were added to them on a uniform basis during their hours of operation. Examples of prior art systems for dispensing chemicals contained in solid briquettes are found in Hunsaker U.S. Pat. No. 3,430,823 as well as in Gilwood U.S. Pat. No. 3,385,483 and Currie U.S. Pat. No. 3,094,134. Each of these systems permits the bottom briquette in a stack to be intermittently contacted and partially dissolved as the water level in a feed chamber cyclically rises and is then emptied by a siphon tube. Although the briquette type units perform quite satisfactorily, the briquettes are expensive to manufacture and restrict somewhat the ability to provide a wide range of suitable chemicals and concentrations. Liquid chemicals are more satisfactory in the latter respects, but existing commercial units utilize drip feeders which can be difficult to start, which are relatively expensive, and which can become very difficult to reuse if the feed bottle is allowed to completely drain so that crystals have a change to form. Also, such feeders are wasteful if they continue to provide chemicals when the unit whose water is being treated is not operating. U.S. Pat. No. 2,461,334 shows a system for siphoning a treatment chemical into a feed chamber, but appears to be quite sensitive to changes in viscosity with temperature, and uses a tube to meter a desired amount of chemical.

SUMMARY

It is among the objects of the present invention to provide a chemical feeder which will offer the advantges of the briquette feeders in dispensing chemicals only when needed while also offering the advantage of being able to utilize a large variety of liquid chemicals which are not available in solid form, and which are easier to package for use.

These and other objects are attained by the dispensing system of the present invention in which a low cost, disposable valve and closure assembly is provided on the top of a container of a liquid chemical. The container is inverted for use and mounted so that the valve depends into a feeder chamber where it will be actuated by a rise in the liquid level within the feeder chamber. In its preferred form, the valve is a spring loaded ball which is actuated by a float member which is mounted in the feeder chamber. Since it is desirable to feed only about 0.1 ml of chemical at each actuation of the valve, the valve assembly includes a tiny chamber of this size immediately above the ball. The tiny chamber communicates with the liquid in the chemical container by means of a small diameter, inverted U-shaped capillary tube. In order to prevent crystallization of chemicals in the valve assembly when the assembly is not actuated for an extended period, the valve assembly is preferably positioned so that a portion of the fluid in the feeder chamber will contact it each time the valve is actuated. The fluid will flush the dispensed chemical away from the flow openings in the valve to a sufficient extent that crystals cannot form and produce clogging.

BRIEF DESCRIPTION OF THE DRAWINGS

FIG. 1 is a sectional side view of the improved closure and valve assembly taken on line 1—1 of FIG. 2;

FIG. 2 is a top sectional view taken on line 2—2 of FIG. 1;

FIG. 3 is a sectional view taken on line 3—3 of FIG. 1;

FIGS. 4–6 are partially sectioned side views showing how the valve assembly of FIG. 1 is actuated to dispense a measured amount of a liquid chemical into a feeder chamber.

DETAILED DESCRIPTION OF THE PREFERRED EMBODIMENT

The improved dispensing apparatus is indicated generally at 10 in FIG. 4. The apparatus dispenses a liquid chemical 12, contained in a container 14, into a feeder chamber 16 which has an inlet port 17 and an outlet curved siphon tube 18. A valve 20 permits fluid 22, which is to be chemically treated, to pass through the inlet port 17 into the feeder chamber 16 at an adjustably controlled rate. A guide pin 23, which extends up from the bottom of the chamber 16, acts as a guide for a float member 24, which may be made of expanded foam or other suitable material. As the level of liquid 22 commences to rise from its lowest level, as indicated in FIG. 4, the float 24 will rise with it until it initially contacts the dispensing valve 30, as indicated in FIG. 5. As additional fluid 22 enters the feeder chamber 16 at a rate exceeding the rate of overflow through the siphon tube 18, the float member 24 will rise further to actuate the spring biased valve control button 31, as shown in FIG. 6. Naturally, the force of the valve actuating button 31 on the float member 24 will cause the level of fluid 22 to rise more than the float. When the fluid level rises sufficiently to completely fill the inverted U-portion of the siphon tube 18, the siphon effect will be established in the tube 18 and the fluid in the chamber 16 will quickly drain to the level shown in FIG. 4.

The construction of the dispensing valve 30 is shown in FIGS. 1–3. The valve is mounted in a molded cap 32 which can be attached by a screw thread, adhesive, or other means to the container 14. The dispensing button 31 is guided on the tubular outer end portion 34 of the cap member 32 and retained by an integral annular ring portion 34'. An internal shouldered ball seat portion 36 on the tubular portion 34 is engaged by a sealing ball 38 which is forced against the seat portion by a spring 40. The upper end of the spring 40 engages a lower surface of the molded insert member 42 which is mounted by adhesive or other means in the bottom of cap member 32. The insert member 42 includes a small circular aperture 46 and a larger slotted opening 48. The exit end of a plastic siphon tube 50 having a capillary opening 52 is pressed tightly into the aperture 46 while the angled inlet end 50' is supported in the slotted opening 48. The capillary siphon tube 50 serves to limit the number of drops of the chemical 12 that can be dispensed into the metering chamber 54 during the time that the ball 38 is lifted from its seat 36 by the actuator portion 31' of button 31 when the latter is lifted by float member 24. Thus, each filling cycle of the chamber 16 by the fluid 22 and the accompanying actuation of the valve assembly 30 will cause a substantially constant amount of the chemical 12 to be dispensed around the ball 38 and down through the openings 58 into the fluid 22. The dispensed quantity of chemical is substantially equal to the free volume of the metering chamber 54 when the ball 38 is seated, the metering chamber comprising the volume of space inside the tube portion 34 between the shouldered portion 36 and the insert plate 42 which contains the capillary tube 50.

To prevent any possibility that the dispensing holes 58 will become blocked from drying and possible crystallization of the chemical 12 when there are long periods in which fluid 22 is not flowing into the chamber, the various elements of the apparatus are preferably formed and positioned relative to each other so that the level of fluid 22 will cover the holes during the dispensing operation. This relationship is apparent in FIG. 6. Since fluid could not be dispensed through a capillary tube from a rigid container 14, a small vent opening 60 is placed in the container 14 after it is inverted to its FIG. 4 operative use position. Although the mounting means for supporting the bottle or container 14 on top of the feeder chamber housing 16 is shown as a shouldered surface 32' on cap 32 resting on the edges of an opening 16', it is obvious that many other forms of connection could be used.

I claim as my invention:

1. An apparatus for dispensing a liquid chemical into an intermittently flowing liquid stream contained in a feeder chamber housing having an inlet opening for receiving said liquid stream and an outlet opening in the form of a siphon tube which is positioned within the chamber so as to intermittently empty substantially all of the liquid in the chamber when the level of the liquid reaches a predetermined maximum elevation, said apparatus comprising mounting means for mounting an inverted container of a liquid chemial on an upper surface of the feeder chamber housing; valve means on said container having an actuating portion extending into said feeder chamber; means mounted in said feeder chamber for actuating said actuating portion of said valve means in response to the liquid in said feeder chamber reaching, or at least closely approaching, said predetermined maximum elevation; said valve means having a metering chamber sized to contain substantially the quantity of liquid chemical which is to be dispensed upon each actuation of the actuating portion; said metering chamber being selectively sealed at its lower end by a sealing means which is controlled by said actuating portion; said metering chamber having its upper end in communication with the liquid in said inverted container by means of an inverted U-shaped capillary siphon tube, said capillary siphon tube serving to slowly fill said metering chamber following each actuation of the actuating portion to empty the chamber.

2. An apparatus in accordance with claim 1 wherein said actuating portion of said valve means includes openings through which liquid from said metering chamber can flow.

3. An apparatus in accordance with claim 2 wherein said openings in said actuating portion are positioned so as to be flushed by the liquid in the feeder chamber as the level of said liquid reaches said predetermined maximum level.

4. An apparatus in accordance with claim 1 wherein said valve means is mounted in a molded sealing cap which normally seals said container of liquid chemical.

5. An apparatus in accordance with claim 4 wherein said sealing cap contains an inner molded insert plate which includes a pair of apertures for retaining the ends of said inverted U-shaped capillary tube, the outer end portion of said sealing cap being tubular in shape and including retaining means for guiding and retaining said actuating portion.

6. An apparatus in accordance with claim 5 wherein said tubular outer end portion of said sealing cap includes a shouldered internal seat portion which cooperates with an internal ball member and a compression spring to form said valve means, said metering chamber comprising the free volume of the internal portion of said tubular outer end portion which is located between said internal seat portion and said capillary siphon tube.

7. An apparatus in accordance with claim 1 wherein said means mounted in said feeder chamber for actuating said valve means comprises a float member.

* * * * *